(12) United States Patent
Shibayama et al.

(10) Patent No.: US 6,918,486 B2
(45) Date of Patent: Jul. 19, 2005

(54) CONVEYOR CHAIN

(75) Inventors: Katsutoshi Shibayama, Osaka (JP);
Yoshihiro Murakami, Osaka (JP);
Hajime Ozaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/649,482

(22) Filed: Aug. 27, 2003

(65) Prior Publication Data

US 2004/0065530 A1 Apr. 8, 2004

(30) Foreign Application Priority Data

Oct. 3, 2002 (JP) ........................................ 2002-291555

(51) Int. Cl.[7] ............................................... B65G 17/06
(52) U.S. Cl. ........................ 198/852; 198/851; 198/850; 198/853
(58) Field of Search ............................... 198/852, 853, 198/851, 850

(56) References Cited

U.S. PATENT DOCUMENTS

| 5,035,318 A | * | 7/1991 | Kawabata et al. | ........... 198/779 |
| 5,309,705 A | * | 5/1994 | Takahashi et al. | ............. 59/78 |
| 5,344,001 A | * | 9/1994 | Kawaai et al. | ............... 198/779 |
| 5,435,435 A | * | 7/1995 | Chiba et al. | ................. 198/853 |
| 5,439,097 A | * | 8/1995 | Takahashi et al. | ..... 198/867.01 |
| 5,746,304 A | * | 5/1998 | Hashino et al. | ........ 198/781.02 |
| 5,881,548 A | * | 3/1999 | Takahashi et al. | ........... 59/78.1 |
| 5,954,190 A | * | 9/1999 | Takahashi et al. | .......... 198/853 |
| 5,988,363 A | * | 11/1999 | Takahashi et al. | .......... 198/841 |
| 6,016,844 A | * | 1/2000 | Takahashi et al. | .......... 138/120 |
| 6,079,553 A | * | 6/2000 | Takahashi et al. | .......... 198/852 |
| 6,189,686 B1 | * | 2/2001 | Shibayama et al. | ......... 198/853 |
| 6,213,292 B1 | * | 4/2001 | Takahashi et al. | .......... 198/853 |
| 6,250,458 B1 | * | 6/2001 | Shibayama et al. | ......... 198/851 |
| 6,471,047 B2 | * | 10/2002 | Shibayama et al. | ...... 198/844.1 |
| 6,527,106 B2 | * | 3/2003 | Tanabe et al. | .............. 198/853 |

* cited by examiner

Primary Examiner—Eileen D. Lillis
Assistant Examiner—Rashmi Sharma
(74) Attorney, Agent, or Firm—Woodling, Krost and Rust

(57) ABSTRACT

To provide an improved conveyor chain, which can convey even a conveying object having high center of gravity at high speed without felling it down in a curved conveying section. A conveyor chain according to the present invention has a plurality of links (10) arranged in rows. Each of the links includes a top plate (11) having a flat top surface (12) and a hinge portion (13) provided on the top plate pin-connected to a hinge portion of a link positioned on the front side and to a hinge portion positioned on the rear side. Edges (19, 24) adjacent to links positioned on the front and rear sides in the top plate and the hinge portions are composed of curved surfaces. An angle of inclination formed by a flat surface (31) including a tangential line with respect to the edge and the top surface (12) of the top plate (11) is formed to be smaller as it goes from the central axis of said link in its arrangement direction toward a link side.

3 Claims, 5 Drawing Sheets

CONVEYOR CHAIN

This application claims the benefit of Japanese Patent Application 2002-291555 filed Oct. 3, 2002.

TECHNICAL FIELD TO WHICH THE INVENTION PERTAINS

The present invention relates to a conveyor chain, and more specifically relates to a chain suitable for a chain conveyor, which performs conveying in a curve.

RELATED ART

In this type of a conventional chain, as shown in FIG. 7, links 11 are adjacently arranged and the links 11 are connected to each other with pins 120. When the chain is moved in a direction of the arrow X by a sprocket or the like, conveying objects on the chain are moved together.

Each link 110 has a top plate 111 with a flat top surface 112. Front hinges 114 are provided on the leading edge side of the top plate 111, and rear hinges 115 are provided on the trailing edge side thereof. Further, on the leading edge side of the top plate 111 are provided front dummy hinges 117 each positioned outside the front hinge 114 and on the trailing edge side thereof are provided rear dummy hinges 118 each positioned outside the rear hinge 115.

The chain comprises front hinges 114 positioned between the rear hinges of a link positioned on the front side and positioned outside the rear hinges thereof, and rear hinges 115 fitted between front hinges of a link positioned on the rear side, a pin being inserted into pin holes 116 in the front hinges 114 and into bushing holes of rear hinges positioned on the front side, and a connecting pin being inserted into bushing holes 116A in the rear hinges 115 and into pin holes of front hinges positioned on the back side.

A conveyor is formed by inserting a hinge portion 113 consisting of the front hinge 114 and the rear hinge 115 between a pair of guide rails, contacting the upper surfaces of the guide rails with the lower surfaces of the top plates 111, and engaging a pawl of a sprocket with a groove arranged between the front hinge 114 and rear hinge 115 in the hinge portion 113 to wrap a chain around the sprocket.

Problems to be Solved by the Invention

When, in such a chain, the link 110 is passed through a curved conveying section, it is slantingly moved in the horizontal direction. A bottom edge 121 of a groove formed between the front hinges 114 of a link 110 and a bottom edge 122 of a groove formed between the front hinge 114 and the dummy hinge 117 of a link 110 on one side with respective to the longitudinal center line of the link 110, are slanted on the rear direction. Also, a bottom edge 121 of a groove formed between the front hinges 114 of a link 110 and a bottom edge 122 of a groove formed between the front hinge 114 and the dummy hinge 117 of a link 110 on the other side with respective to the longitudinal center line of the link 110, are slanted on the rear direction. Therefore, the rear hinge 115 and rear dummy hinge 118 can be slantingly moved inside the groove in the horizontal direction.

Further, when the link 110 is passed through a curved conveying section, it can be slantingly moved even in the vertical direction. Then, a step is formed between a front dummy hinge 117 positioned on an outer side of a curved conveying section, and a rear dummy hinge positioned on the front side, to which a front dummy hinge 117 on the front side in FIG. 7 is adjacent. On the other hand, in a curved conveying section conveying objects are subjected to an action of external force such as centrifugal force and move on the chain. Thus, the conveying objects suddenly drop down due to the step and falls down. Further, when the conveying line is speeded up, an accident of falling down often occurs To improve this problem soapy water is flushed on the top surface of the top plate 111 to decrease friction between a conveying object and a link, and various improvements are added to the material of the link 110 to obtain low friction. Accordingly, when external force is acted on the conveying object, the conveying object can be smoothly moved to the link positioned on the front or rear side.

However, conveying objects having high center of gravity, which are felled down by slight inclination of the positions, such as PET bottles, have been increased. By such measures the falling down of the conveying object cannot be prevented reliably. As a result it is desired that such a conveying object having high center of gravity can be conveyed in a stable manner and at high speed.

Accordingly, the object of the present invention is to provide an improved conveyor chain, which can convey even a conveying object having high center of gravity at high speed without felling it down in a curved conveying section Means for Solving the Problems To attain the above-mentioned object, a conveyor chain according to the present invention having a plurality of links arranged in rows, each of said links including a top plate having a flat top surface and a hinge portion provided on said top plate pin-connected to front hinge portions of a link positioned on the front side and to a rear hinge portions positioned on the rear side, edges adjacent to links positioned on the front and rear sides in said top plate and said hinge portion each consisting of a curved surface is characterized in that an angle of inclination formed by a flat surface including a tangential line with respect to said edge and said top surface of said top plate is formed to be smaller as it goes from the central axis of said link in its arrangement direction toward a link side surface.

Action

In the conveyor chain according to the present invention having a plurality of links arranged in rows, each of said links including a top plate having a flat top surface and a hinge portion provided on said top plate pin-connected to front hinge portions of a link positioned on the front side and to a rear hinge portions positioned on the rear side, edges adjacent to links positioned on the front and rear sides in said top plate and said hinge portion each consisting of a curved surface, an angle of inclination formed by a flat surface including a tangential line with respect to said edge and said top surface of said top plate is formed to be smaller as it goes from the central axis of said link in its arrangement direction toward a link side surface. Accordingly, when a link is passed through a curved conveying section, even if an edge positioned on an outer side of the curved conveying section and adjacent to links positioned at the front or rear side is protruded, links are connected to each other by an edge, whose angle becomes gentler as it gets closer to a link side, and a step between the edge and the adjacent link is not large. As a result even if conveying objects are subjected to an action of external force, they do not fall down and can smoothly transfer to the adjacent link.

The invention will be better understood when reference is made to the Brief Description of the Drawings, Detailed Description of the Invention and claims which follow hereinbelow.

A better understanding of the invention will be had when reference is made to the Detailed Description of the Invention and claims which follow hereinbelow.

DETAILED DESCRIPTION OF THE INVENTION

Embodiments of the Invention

An embodiment of a conveyor chain according to the present invention will be described below with reference to FIGS. 1 to 6.

Figure 1:
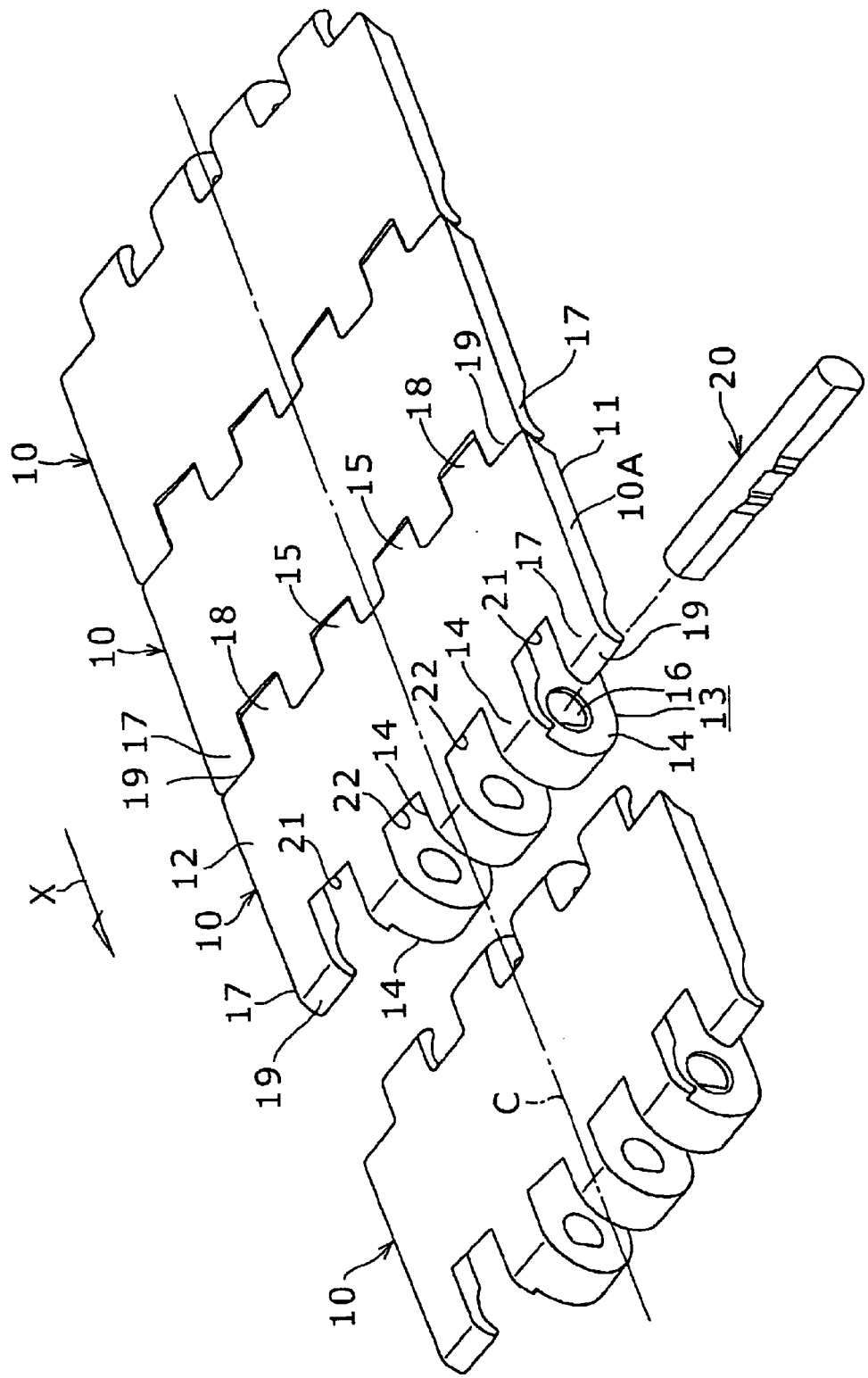
FIG. 1 is a perspective view showing an embodiment of a conveyor chain according to the present invention.
Figure 2:
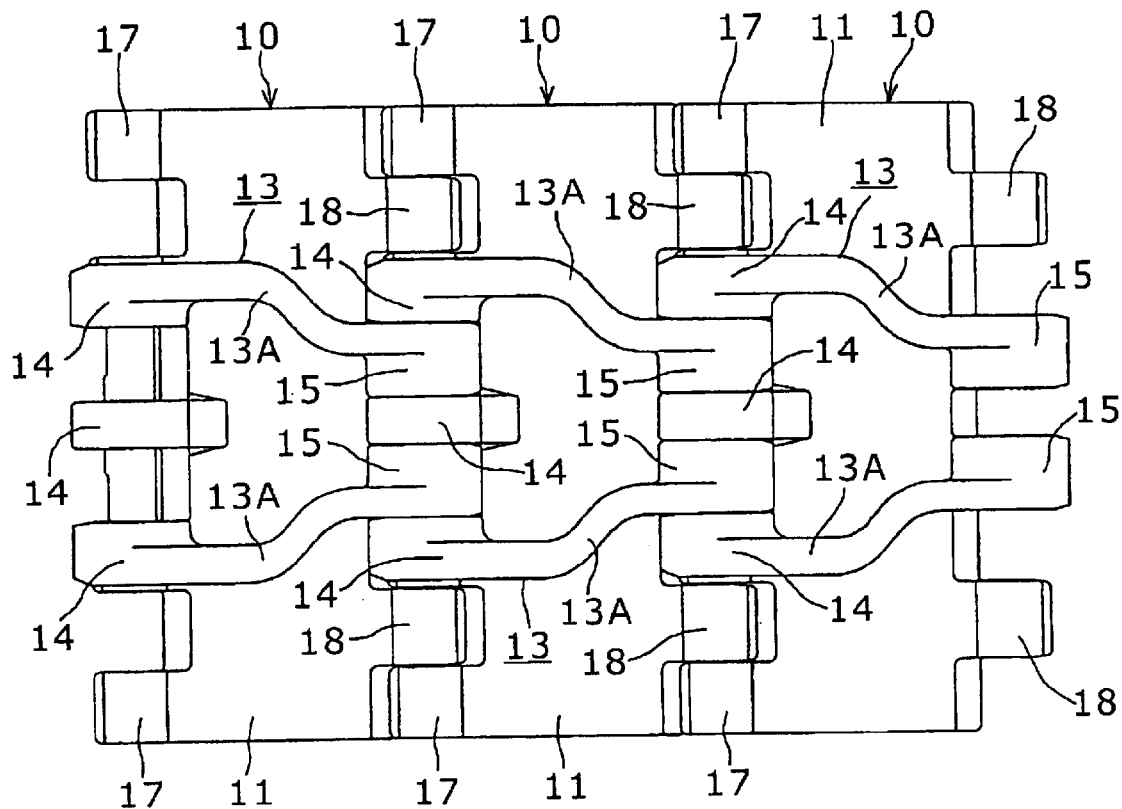
FIG. 2 is a bottom view of the conveyor chain shown in FIG. 1.
Figure 3:
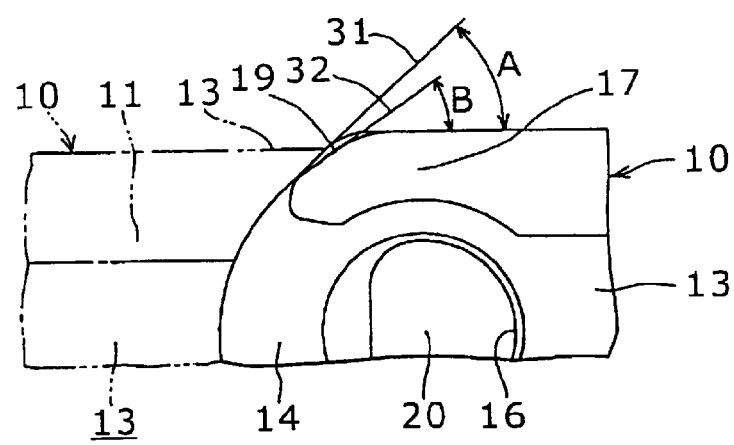
FIG. 3 is an enlarged side view of a front dummy hinge of a link of the conveyor chain shown in FIG. 1.

FIGS. 1 to 3 show an embodiment of a conveyor chain according to the present invention. This chain is moved as shown by an arrow X in FIG. 1.

This conveyor chain has a number of links 10 arranged in rows. Each of links 10 is composed of an engineering plastic molded product. Each link 10 includes a top plate 11. The top plate 11 has a plate-shaped form having a flat top surface 12. A hinge portion 13 is integrally formed on a lower surface of the top plate 11.

This hinge portion 13 has three front hinges 14 and two rear hinges 15 in this embodiment. The front hinges 14 are arranged on the leading edge side of the top plate 11 at equal intervals, and the rear hinges 15 are arranged on the trailing edge side of the top plate 11 so that they form a slightly wider space than the width of the front hinge 14. As shown in FIG. 2, the two front hinges 14 positioned on the outer sides among the three front hinges 14 each are connected to each of the rear hinges 15 by a side wall 13A. A pin hole 16 is provided in each of the front hinges 14. A bushing hole, although not shown, having a wider width in the front and rear direction than the pin hole 16 is provided in each of the rear hinges 15.

On the outsides of the hinge portion 13, that is on the outsides of the two front hinges 14 positioned on the outer sides are arranged front dummy hinges 17. And on the outsides of the rear hinges 15 are arranged rear dummy hinges 18. The front dummy hinge 17 forms a space slightly wider than the width of the rear dummy hinge 18 between the front dummy hinge 17 and the front hinge 14, and is arranged at the leading edge of the top plate 11. Further the front dummy hinge 17 is integrally formed with the top plate 11. Also, the rear dummy hinge 18 forms a space slightly wider than the width of the front hinge 14 between the rear dummy hinge 18 and the rear hinge 15, and is arranged at the trailing edge of the top plate 11. Further the rear dummy hinge 18 is integrally formed with the top plate 11.

The chain is formed by arranging links 10 in rows, fitting the central front hinge 14 and the outer front hinges 14 between rear hinges positioned on the front side and between the rear hinge and the rear dummy hinge with the font dummy hinges 17 fitted outside the rear dummy hinge 18, providing front dummy hinges 17 on both outer sides of the link, fitting the rear hinges 15 and the rear dummy hinges 18 between front hinges 14 of a link positioned on the rear side and between the front hinge 14 and a front dummy hinge 17, respectively, and inserting a pin 20 into pin holes of the front hinges 14 and bushing holes of a link positioned on the front side and also inserting a pin 20 into busing holes of the rear hinges 15 and pin holes of front hinges of a link positioned on the rear side, so that all links 10 are connected to each other.

Further, in this chain an edge of the front hinge 14, adjacent to a link positioned on the front side has an arc-shaped surface. This arc-shaped surface continues to the top surface 12 of the top plate 11 with a flat surface. Also, an edge of the front dummy hinge 17, adjacent to a link positioned on the front side has an arc-shaped surface. This arc-shaped surface continues to the top surface 12 of the top plate 11 with a flat surface. Further, edges of the rear hinge 15 and rear dummy hinge 18, adjacent to a link positioned on the rear side have arc-shaped surfaces. This arc-shaped surfaces continue to the top surface 12 of the top plate 11 with flat surfaces.

An angle of inclination of an edge 19 of the front dummy hinge 17 with respect to each link 10 is formed to be smaller as it goes from the central axis C of the link 10 in the longitudinal direction thereof toward a side surface 10A of the link 10. The details of these contents will now be described.

That is, as shown in FIG. 3, when an angle of inclination formed by a flat surface 31 including a tangential line to a portion near the central axis C of the front hinge link 10 in the longitudinal direction or a portion on a side of the hinge portion 13 and the top surface 12 of the top plate 11 or the horizontal surface is defined as A, and when an angle of inclination formed by a flat surface 32 including a tangential line to a portion of the side surface 10A of the link 10, which is on the opposite side, and the top surface 12 of the top plate 11 or the horizontal surface is defined as B, the relation of A>B is satisfied in the edge 19 of the front dummy hinge 17. That is the edge 19 is formed so that said angle of inclination is gradually decreased as it goes from the central axis C of the link in the longitudinal direction toward the side surface 10A of the link.

A conveyor is formed, as in this kind of known chain, by placing a lower surface of a top plate 11 on a guide rail with a hinge portion 13 dropped between a pair of guide rails and wrapping it around a sprocket. A pawl of a sprocket is engaged with a groove located between a front hinge 14 and a rear hinge 15 in a hinge portion 13.

A conveyor operation is performed by placing objects such as PET bottles on a chain and rotating a sprocket by an electric motor. When the chain is moved in a direction of the arrow X (FIG. 4), each link 10 slides on a guide rail in a straight conveying section to convey PET bottles on the top surface of the top plate 11.

When each link 10 was subjected to large tension and is moving at high speed during passing through a curved conveying section, it is slantingly move in a vertical direction. That is when the link 10 enters the curved conveying section, it can be slantingly moved in a vertical direction with respect to a curvature radius. Then the link 10 protrudes in such a manner that an edge of the link 10 outside the curved conveying section is higher than the opposite side edge of the link 10. The dummy hinge 17 shown in FIG. 1 protrudes from the front link 10 in FIG. 1. However, in a chain of the present invention, as described above, an angle of inclination of an edge 19 adjacent to a link positioned on the front side at a front dummy hinge 17 is gradually decreased as it goes from the central axis C of the link 10 in the longitudinal direction of the link 10 toward a side surface 10A of the link. Accordingly, even if the link is slantingly moved in a vertical direction so that an edge 19 of the front dummy hinge 17 is protruded from a link 10 positioned on the front side, the edge 19 of the front dummy hinge 17 is connected to the link 10, positioned on the front side, by an inclined surface having a further reduced slope as it gets closer to the side surface of the link 10. Therefore, when the conveying objects are passed through a curved conveying section, even if they are subjected to external force such an centrifugal force or the like, the objects are smoothly moved on the top surfaces of top plates 12 including the link 10 positioned on the front side and the front dummy hinge 17 whereby they do not fall down.

It is noted that in this chain a bottom edge 21 of a groove formed between a front hinge 14 and a front dummy hinge 17 and a bottom edge 22 of a groove formed between the central front hinge 14 and one outer front hinge 14 are slanted outward from the center of the link 10 or the top plate 11 toward the side surface thereof. Further, also, a bottom edge 21 of a groove formed between a front hinge 14 and a remaining front dummy hinge 17 and a bottom edge 22 of a groove formed between the central front hinge 14 and the other outer front hinge 14 are slanted outward from the center of the link 10 or the top plate 11 toward the side surface thereof. Therefore, the link 10 is slanted in a horizontal direction in a curved conveying section, a rear hinge of a link positioned at a front side can be freely moved in a groove formed between front hinges 14, and a rear dummy hinge can be also freely moved in a groove formed between a front dummy hinge 17 and a front hinge 14.

Thus, in a conveyor chain according to the present invention, conveying objects can be moved smoothly between links in a curved conveying section. Accordingly, even conveying objects such as PET bottles each having high center of gravity can be moved at high speed in a curved conveying section without felling them down.

Figure 4:
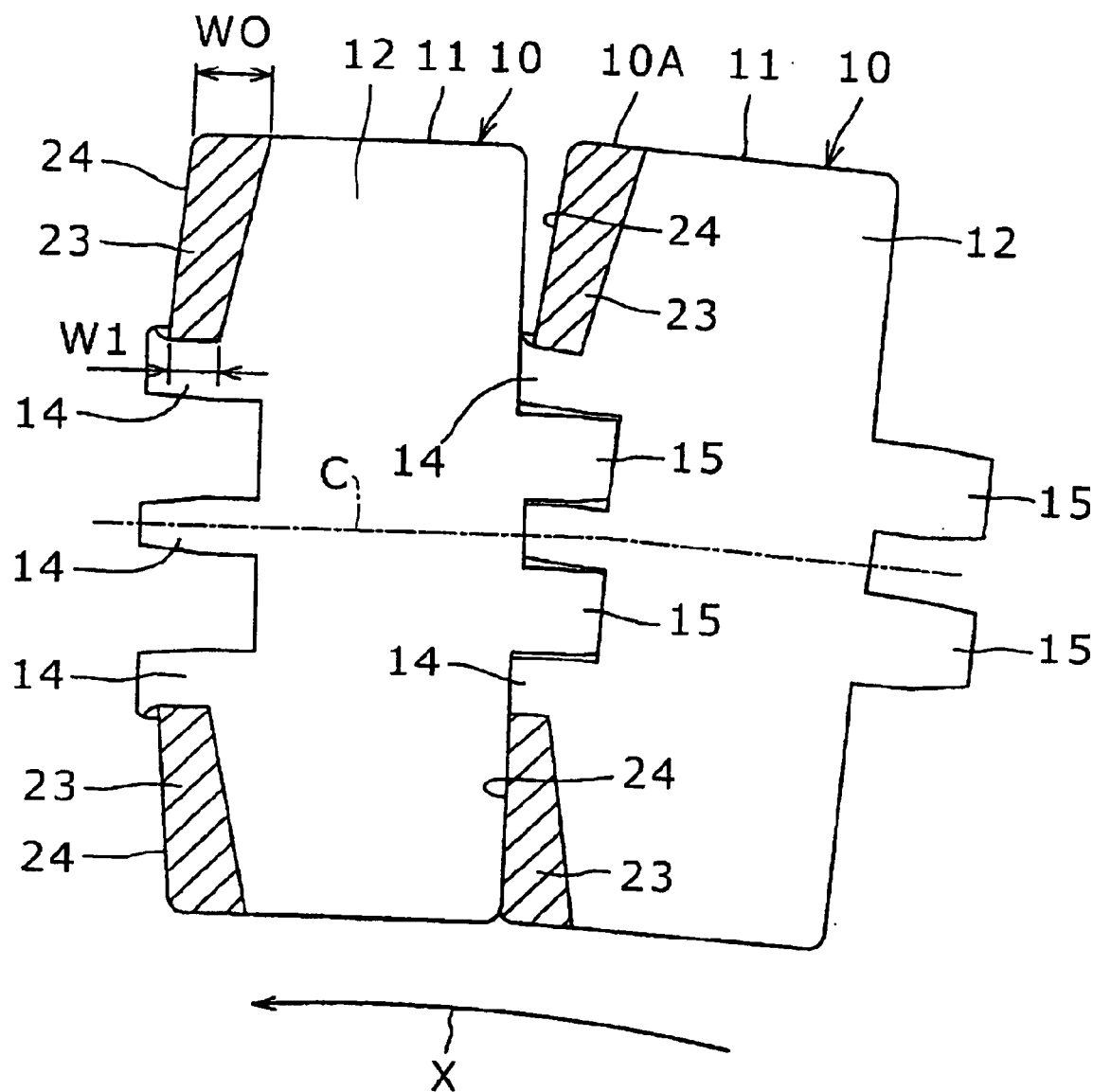
FIG. 4 is a plan view showing another embodiment of a conveyor chain.
Figure 5:
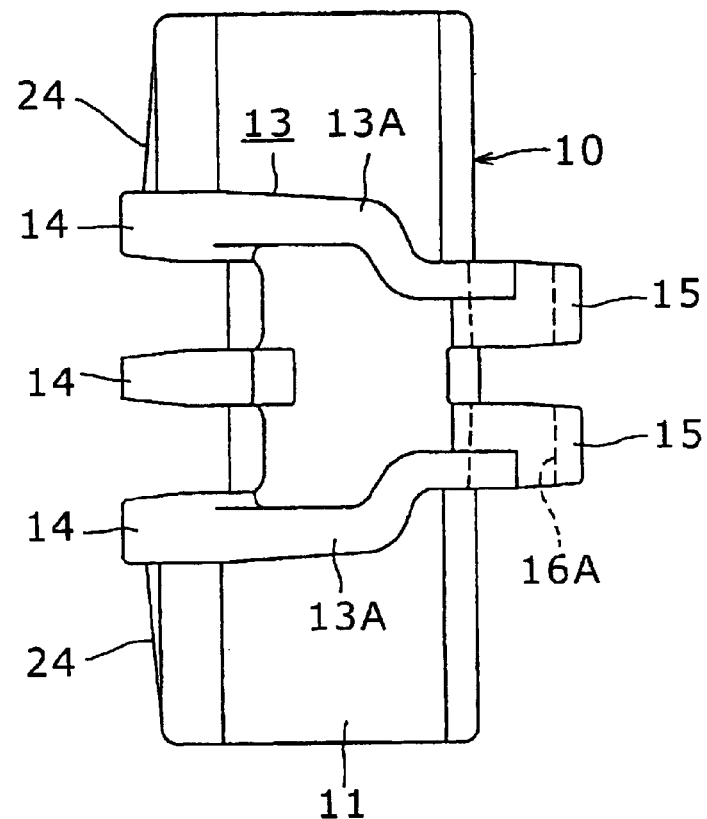
FIG. 5 is a bottom view of the conveyor chain shown in FIG. 4.
Figure 6:
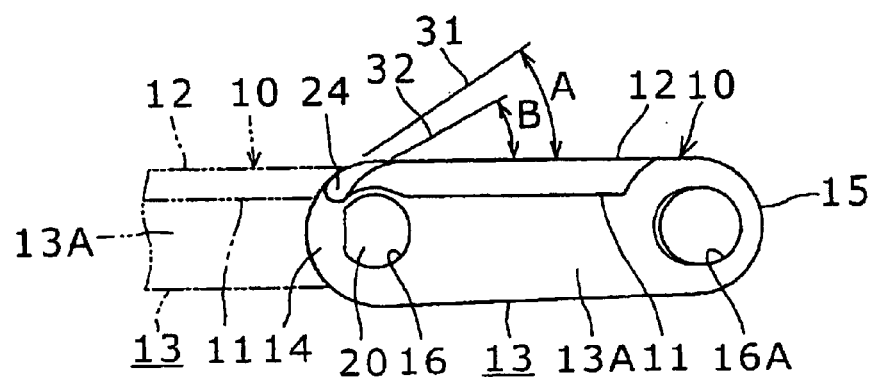
FIG. 6 is a side view of the conveyor chain shown in FIG. 4.
Figure 7:
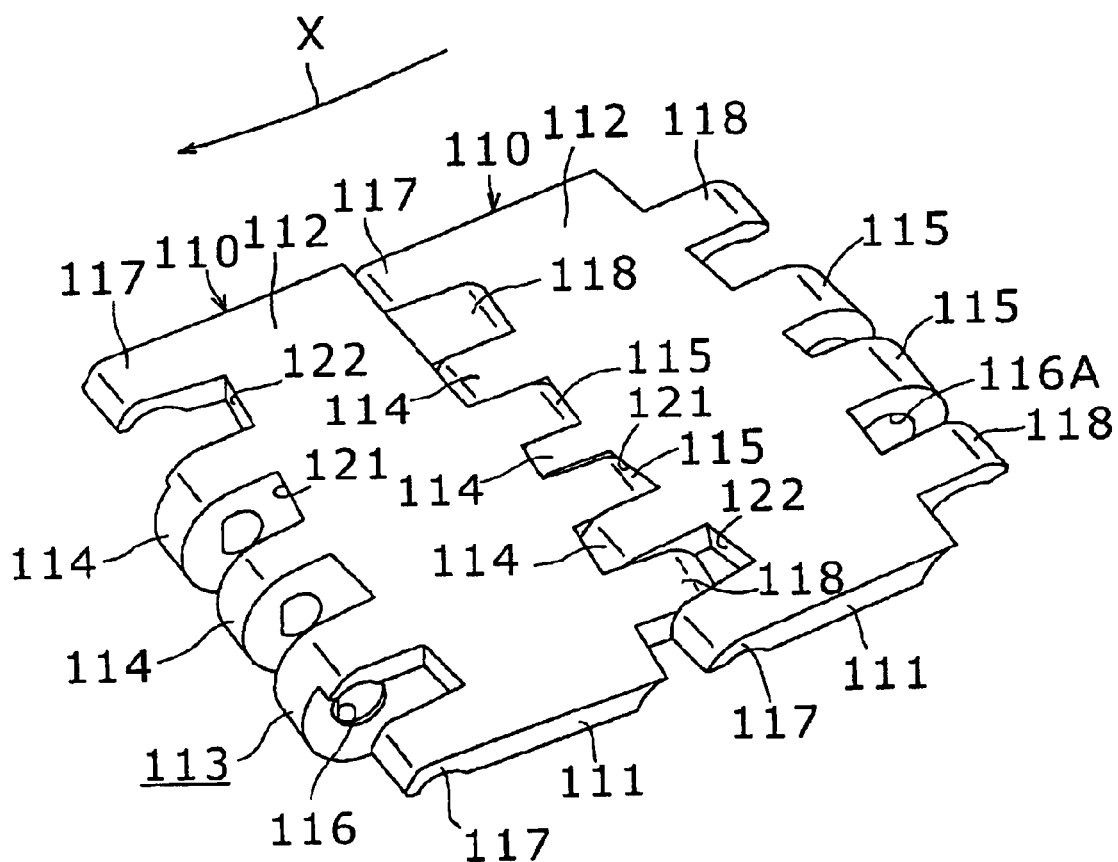
FIG. 7 is a perspective view shown in a conventional conveyor chain.

FIGS. 4 to 6 show another embodiment of a conveyor chain according to the present invention.

This conveyor chain is endless and is moved from a right side toward a left side as shown in FIG. 4. FIG. 4 shows a state where a link 10 is passed through a curved conveying section.

The conveyor chain includes a number of links 10 arranged in rows. Each of the links 10 has a top plate 11. The top plate 11 has a plate-shaped form having a flat top surface 12.

Front hinges 14 are on the leading edge of a top plate 11 and rear hinges are on the trailing edge thereof. These front hinges 14 are arranged in the vicinity of the center of the top plate 11. The rear hinges 15 form a slightly wider space than a width of the front hinge 14. The front hinge 14 and the rear hinge 15 are connected to each other by a wall 13A extending from a lower surface of the top plate 11 to form one hinge portion 13. A pin hole is provided in a side surface of each front hinge 14, and in the side surface of a rear hinge 15 is provided a bushing hole 16A having a wider width than that of the pin hole as shown in FIG. 6.

In this chain a top plate 11 of each link 10 does not include a dummy hinge on the leading edge. However, as shown by hatched lines in FIG. 4, the top plate 11 of each link 10 has front edges 23. In each of the edges 23 a width WO of the side of a link side surface is larger than a width W1 of the hinge portion side when viewed from above. A front edge on one side with respect to the centerline C in the longitudinal direction of the link has an edge 24 adjacent to a rear edge of a top plate of a link positioned on the front side. The edge 24 is slanted backward. Also, another edge 24 of the opposite front edge 23 with respect to the centerline C in the longitudinal direction of the link is slanted backward.

The edge 24 of the front edge 23 has an arc-shaped surface, as shown in FIG. 6. The arc-shaped surface is connected to the top surface 12 of the top plate 11 by a flat surface. When an angle of inclination formed between a flat surface 31 including a tangential line with respect to a front hinge side portion in the edge 24 or a portion on the centerline side in the longitudinal direction of a link and the top surface 12 or a horizontal surface, is defined as A, and a flat surface 32 including a tangential line with respect to a side surface side of a link or the top plate 11 in each curved surface and the top surface 12 or a horizontal surface, is defined as B, the angle of inclination B is smaller than the angle of inclination A at the edge 24 and the edge 24 is formed so as to be changed from the angle of inclination B to the angle of inclination A.

In the chain a front hinge 14 is arranged between rear hinges of a link positioned on the front side and front hinges 14 are arranged outside these rear hinges respectively. Further, each of two rear hinges 15 are fitted between front hinges of a link positioned on the rear side. Then a pin 20 is inserted into pin holes 16 of the front hinges 14 and bushing holes of the rear hinges of a link positioned on the front side, and also, a connecting pin is inserted into bushing holes 16A of the rear hinges 15 and pin holes of the front hinges of a link positioned on the rear side. Thus, the chain is endlessly formed.

A conveyor is formed by placing a lower surface of a top plate 11 on a guide rail with a hinge portion 13 dropped between a pair of guide rails and wrapping the chain around a sprocket. A pawl of a sprocket is engaged with a groove located between a front hinge 14 and a rear hinge 15 in a hinge portion 13.

A conveyor operation is performed by placing objects such as PET bottles on the top surfaces 12 of top plates 11 and rotating a sprocket by an electric motor. When the sprocket is rotated, each of links 10 slides on a guide rail in a direction of the arrow X in FIG. 4 to convey PET bottles on the top surface of the top plate 11.

In the curved conveying section, even if a link 10 is slantingly moved in a horizontal direction and a portion located inside the curved conveying section in a link positioned on the front side, that is an rear edge of a top plate shown on the front side of FIG. 4 moves near the front edge 23, since the edge 24 of the front edge 23 is slanted from an end portion where it is connected to a front hinge 14 toward a leading edge or a link positioned at the rear side, a link positioned at the front side can be freely slantingly moved in a horizontal direction.

Further, when the link 10 is subjected to large tension and the chain is moved at high speed, the link 10 can slantingly move in a vertical direction with respect to the center of a radius of a curved conveying section. In that case, an end portion of the outer side in an front edge 23 of the top plate 11 in the curved conveying section, that is a side surface 10A of the upper link 10 in FIG. 4 becomes higher than the top plate of the link positioned on the front side of FIG. 4. However, since an angle B of inclination of the front edge 23 with respect to a portion, which is the outer side in the curved conveying section is smaller than an angle A of inclination of the front edge with respect to a portion, which is the inner side in the curved conveying section, and an angle of inclination between the portions is formed to be gradually smaller, and further, the slope of the front edge 23 becomes gentler as it comes near the side surface of a link 10 from a hinge portion 13. Therefore, when conveying objects are passed through a curved conveying section, even if they are subjected to action of external force such as centrifugal force or the like, they smoothly move to a link positioned at the front side without falling down.

As described above, since the conveyor chain according to the present invention can smoothly move on a top plate in a curved conveying section, it can move in the curved conveying section without falling down even at high conveying speed. Further, even if the conveying object is one having high center of gravity such as a PET bottle, it can be moved on the curved conveying section without falling down.

It is noted that at the edge 19 of the front dummy hinge 17 or the edge 24 of the front edge 23 of the top plate in the above-described example, an angle of inclination formed between the flat surface 31 including a tangential line with respect to the edge 19 or 23 and the top surface 12 of the top plate 11 or the horizontal line, is formed to be gradually decreased from the inside toward the outside, but only the edge 19 of one front dummy hinge 17 or only the edge 23 of the front edge 23 is formed to be as such so that the chain may be exclusively used every direction of a curve.

Further, when the flat surfaces of the front hinges 14, rear hinges 15, front dummy hinges 17 and rear dummy hinges 18 are within a curved conveying section, they may be formed so that they are overlapped with each other and are, at the same time, flush with the top surface 12 of the top plate 11. In such chains most portions become the same flat surface as the top surface 12 of the top plate 11. Thus, even if conveying objects are subjected to external force, they can smoothly move between links. Accordingly, the falling of the conveying objects can be reliably prevented.

Effects of the Invention

As described above, in the conveyor chain according to the present invention having a plurality of links arranged in rows, each of said links including a top plate having a flat top surface and a hinge portion provided on said top plate pin-connected to front hinge portions of a link positioned on the front side and to a rear hinge portions positioned on the rear side, edges adjacent to links positioned on the front and rear sides in said top plate and said hinge portion each consisting of a curved surface, an angle of inclination formed by a flat surface including a tangential line with respect to said edge and said top surface of said top plate is formed to be smaller as it goes from the central axis of said link in its arrangement direction toward a link side surface. Accordingly, when a link is passed through a curved conveying section, even if an edge positioned outside the curved conveying section and adjacent to links positioned at the front or rear side is protruded, links are connected to each other by an edge, whose angle becomes larger as it gets closer to a link side, and a space between the edge and the adjacent link is not changed suddenly. Thus, even if conveying objects are subjected to an action of external force, they do not fall down and can smoothly transfer to the adjacent link. As a result even if a conveying object has high center of gravity it can be reliably curve-conveyed and it is possible to speed up the conveying line.

DESCRIPTION OF REFERENCE NUMERALS

10 Link
11 Top plate
13 Hinge portion
14 Front hinge
15 Rear hinge
17 Front dummy hinge
18 Rear dummy hinge
19 Edge of a front dummy hinge
20 Pin
23 Front edge of a top plate
24 Edge of a top plate Although the invention has been described herein by way of example only, those skilled in the art will readily recognize that certain changes and modifications may be made without departing from the spirit and scope of the appended claims.

We claim:

1. A conveyor chain having a plurality of links arranged in rows, each of said links includes a top plate having a flat top surface, a front hinge portion, a rear hinge portion, a central axis and side edges, said front hinge portion of each said link positioned on the front side thereof being pin connected to said rear hinge portion of an adjacent link, each of said links having a rear hinge portion positioned on the rear side thereof, said front hinge portion of each said link includes a curved surface, characterized in that an angle of inclination is formed between said flat top surface of said link and a line which is tangential to said curved surface, said angle of inclination varies and becomes smaller as the distance from the central axis of said link increases in the direction toward link side edge.

2. A conveyor chain according to claim 1, characterized in that each of said links includes dummy front hinges on both sides thereof, each of said front dummy hinges includes a curved surface, said curvature of said curved surface of said front hinge varies as the distance from the central axis increases, an angle of inclination is formed between said flat top surface of said link and a line which is tangential to said curved surface, said angle of inclination varies and becomes smaller as the distance from the central axis of said link increases in the direction toward a link side edge.

3. A conveyor chain according to claim 1, characterized in that said top plate has a front edge arranged outside said link portion and slanted toward a link positioned on the rear side, an edge of said front edge, adjacent to a rear edge of a link positioned on the front side and that an angle of inclination formed by a flat surface including a tangential line with respect to the curved surface and said top surface of said top plate is formed to be smaller as it goes from the central axis of said link in its arrangement direction toward a link side surface.

* * * * *